United States Patent [19]

Hisatomi et al.

[11] Patent Number: 5,030,525

[45] Date of Patent: Jul. 9, 1991

[54] INORGANIC NONAQUEOUS ELECTROLYTIC SOLUTION TYPE CELL

[75] Inventors: Kaoru Hisatomi; Hiroshi Sasama; Kazuo Ishida; Shintaro Sekido, all of Osaka, Japan

[73] Assignee: Hitachi Maxell, Ltd., Osaka, Japan

[21] Appl. No.: 565,514

[22] Filed: Aug. 10, 1990

[30] Foreign Application Priority Data

Aug. 16, 1989 [JP] Japan .................................. 1-211108

[51] Int. Cl.⁵ .............................................. H01M 10/40
[52] U.S. Cl. ..................................... 429/101; 429/145; 429/196; 429/252
[58] Field of Search ................. 429/101, 194, 196, 197, 429/249, 252, 144, 145

[56] References Cited

U.S. PATENT DOCUMENTS

| | | | |
|---|---|---|---|
| 4,042,756 | 8/1977 | Goebel et al. ......................... | 429/94 |
| 4,118,334 | 10/1978 | Goebel ............................. | 429/194 X |
| 4,224,394 | 9/1980 | Schmidt .............................. | 429/252 |
| 4,318,969 | 3/1982 | Peled et al. ......................... | 429/105 |
| 4,375,501 | 3/1983 | Peled et al. ......................... | 429/94 |
| 4,550,064 | 10/1985 | Yen et al. ........................... | 429/94 |
| 4,637,966 | 1/1987 | Uba et al. .......................... | 429/252 X |

Primary Examiner—Anthony Skapars
Attorney, Agent, or Firm—Birch, Stewart, Kolasch & Birch

[57] ABSTRACT

An inorganic nonaqueous electrolytic solution type cell comprising a separator which is positioned between a negative electrode and a positive electrode, a bottom insulator which is positioned between a bottom of a cell container and a positive electrode, and an electrolytic solution comprising an electrolyte and an oxyhalide which is in the liquid state at room temperature and serves as an active material for a positive electrode and a solvent for the electrolytic solution, wherein each of the separator and the bottom insulator comprises a material selected from the group consisting of a microporous film of an ethylene-tetrafluoroethylene copolymer and a composite sheet of a microporous film of an ethylene-tetrafluoroethylene copolymer and a nonwoven glass fabric.

8 Claims, 3 Drawing Sheets

Fig. 2
Fig. 1A
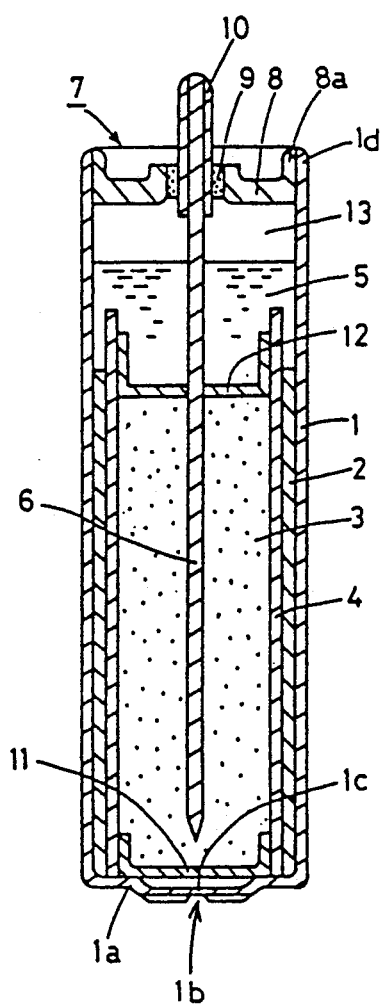
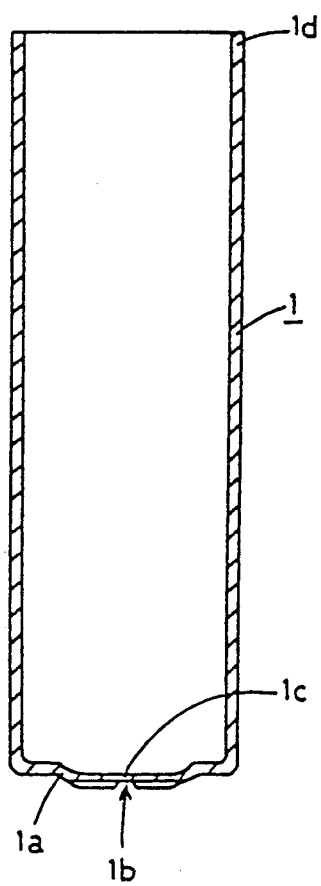
Fig. 1B
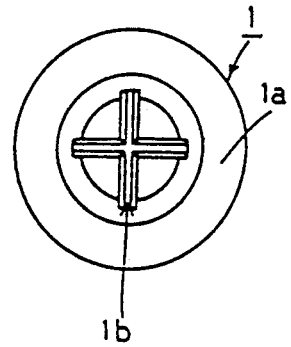

Fig. 3
Fig. 4
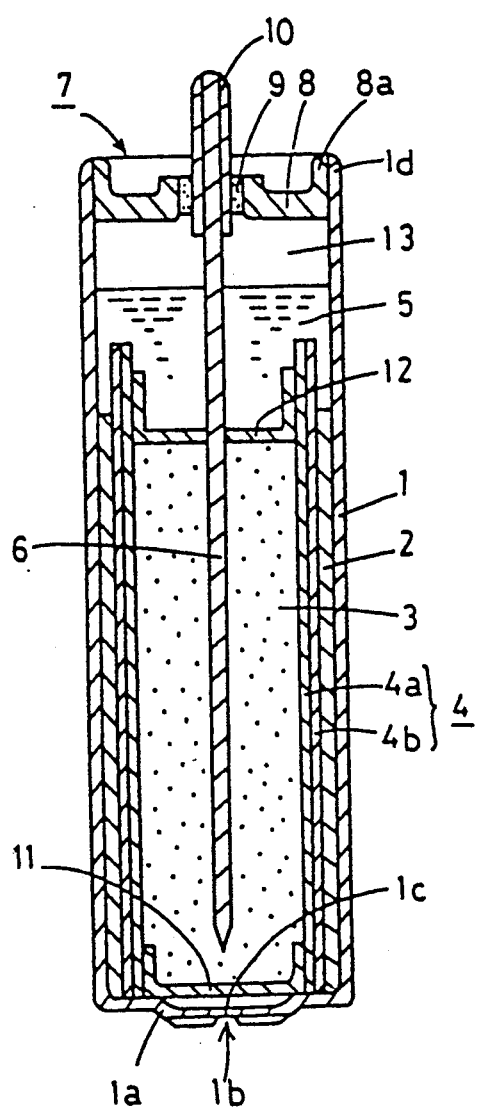
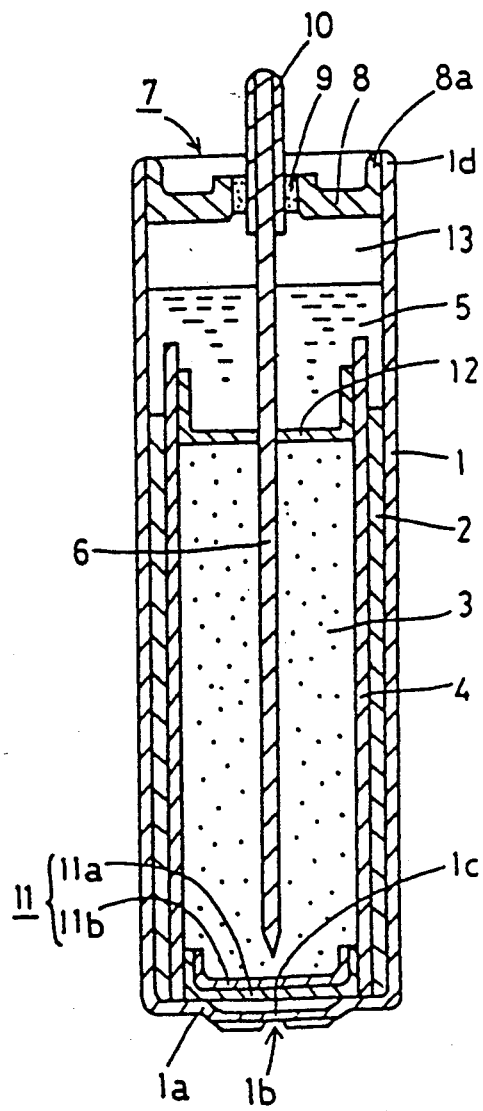

INORGANIC NONAQUEOUS ELECTROLYTIC SOLUTION TYPE CELL

BACKGROUND OF THE INVENTION

1. Field of the Invention

The present invention relates to an inorganic nonaqueous electrolytic solution type cell comprising an oxyhalide which serves as an active material for positive electrode and also as a solvent for an electrolytic solution and a negative electrode made of an alkali metal.

2. Description of the Related Art

An inorganic nonaqueous electrolytic solution type cell, which comprises an oxyhalide which is in the liquid state at room temperature (e.g. thionyl chloride, sulfuryl chloride and phosphoryl chloride) as an active material for positive electrode, an alkali metal (e.g. lithium, sodium and potassium) as a negative electrode, a porous carbon molded article as a positive electrode and in which the oxyhalide serves as a solvent for an electrolytic solution, has a large energy density and works at a lower temperature. However, since the oxyhalide and the alkali metal easily react with water, a completely sealed structure with a hermetic sealing is used. (cf. Japanese Patent Kokai Publication No. 160660/1987).

The cell having the hermetic sealing has high sealing completeness and good storage stability. However, because of such high sealing completeness, when such cell encounters abnormal conditions such as high temperature or charging at high voltage, an internal pressure of the cell increases extraordinarily and a cell container is burst by high pressure, so that a large burst noise is made and contents in the cell are scattered and contaminate an apparatus using the cell.

To prevent the above total breakage of the cell, it is proposed to provide an explosion proof mechanism to the cell so as to prevent explosion of the cell by the increase of internal pressure. For example, as shown in FIGS. 1A and 1B. a thin-walled part 1c is formed on a bottom 1a of a cell container 1. When the internal pressure of the cell is increased to a certain pressure through thermal expansion of the electrolytic solution caused by increase of the temperature, the thin-walled part 1c is broken, whereby the explosion of the cell container 1 is prevented (cf Japanese Patent Kokai Publication No. 86234/1988).

In the above conventional cell having the thin-walled part in the bottom, the cell container functions as a negative electrode terminal and a negative electrode 2 contacts the inner surface of the casing 1. If the cell is abruptly heated by, for example, accidentally dropping the cell in the fire, the alkali metal which constitutes the negative electrode 2 melts before the explosion proof mechanism is actuated, the molten alkali metal passes through a separator 4 made of a nonwoven glass fabric to reach a positive electrode 3. Then, the molten alkali metal and the positive electrode vigorously react with each other, whereby heat is vigorously generated and the internal pressure of the cell abruptly increases to burst the cell container 1.

SUMMARY OF THE INVENTION

An object of the present invention is to provide an inorganic nonaqueous electrolytic solution type cell having an explosion proof mechanism which is normally actuated when the cell is very quickly heated, whereby the burst of the cell container is prevented.

Accordingly, the present invention provides an inorganic nonaqueous electrolytic solution type cell comprising:

a cell container in the form of a cylinder which has a bottom with a thin-walled part for explosion proof, a cell cap which comprises a body, a positive electrode terminal and an insulating layer for insulating said body and said positive electrode terminal, a periphery of said body being bonded to an opening edge of said cell container, a negative electrode which is made of an alkali metal and positioned inside said cell container, a positive electrode which is made of a porous carbonaceous material and positioned inside said negative electrode, a separator which is positioned between said negative electrode and said positive electrode, a bottom insulator which is positioned between said bottom of the cell container and said positive electrode, and an electrolytic solution comprising an electrolyte and an oxyhalide which is in the liquid state at room temperature and serves as an active material for said positive electrode and a solvent for said electrolytic solution, wherein each of said separator and said bottom insulator comprises a material selected from the group consisting of a microporous film of an ethylene-tetrafluoroethylene copolymer and a composite sheet of a microporous film of an ethylene-tetrafluoroethylene copolymer and a nonwoven glass fabric.

BRIEF DESCRIPTION OF THE DRAWINGS

FIGS. 1A and 1B are a cross sectional view of a cell container and a plan view of a bottom of the cell container, FIGS. 2-5 are cross sectional views of various embodiments of the inorganic nonaqueous electrolytic solution type cell of the present invention.

DETAILED DESCRIPTION OF THE INVENTION

Figure 5:
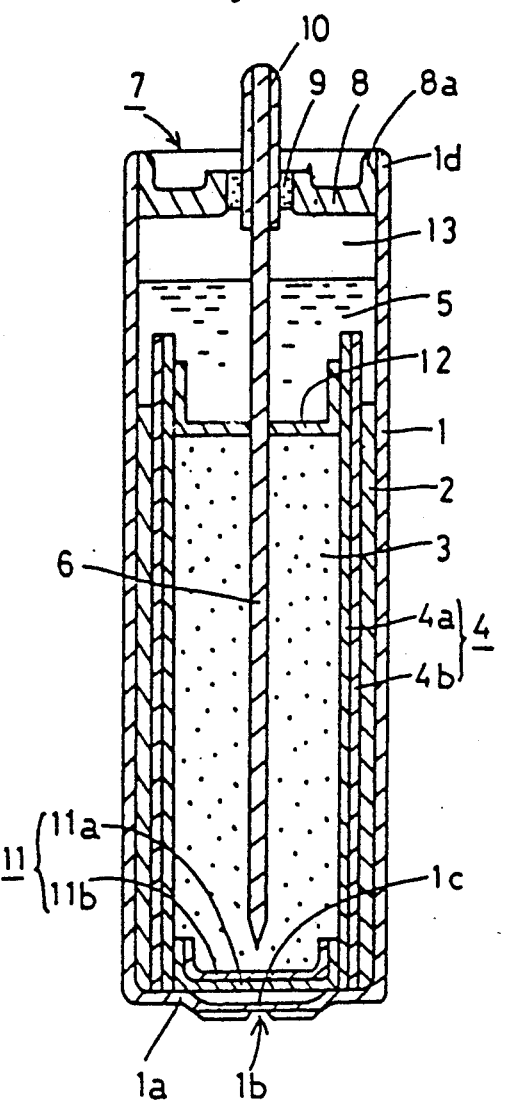

In the cell of the present invention, the separator and the bottom insulator comprise the microporous film of the ethylene-tetrafluoroethylene copolymer. Since the micropores of such film are substantially uniform and their passes are complicatedly curved, the separators can retard migration of the molten alkali metal through the separator to the positive electrode even when the alkali metal constituting the negative electrode is molten. As the result, the thin-walled part of the bottom is broken by the thermal expansion of the electrolytic solution prior to the contact of the alkali metal melt to the positive electrode, and the burst of the cell container is prevented.

The reasons why, in the conventional inorganic nonaqueous electrolytic solution type cell, the explosion proof mechanism does not work and the cell container is burst when the cell is abruptly heated while, in the cell of the present invention, such burst of the cell container is prevent will be discussed more in detail.

In the conventional inorganic nonaqueous electrolytic solution type cell, the nonwoven glass fabric is used as the separator because the oxyhalide has strong oxidation activity and the separator should have excellent oxidation resistance.

However, since the nonwoven glass fabric is formed from glass fibers which entangle each other, the pore sizes are not uniform, and large pores may be present on the fabric surface and are connected three-dimensionally. Therefore, the alkali metal melt very easily passes through the separator.

On the contrary, since the micropores of the ethylene-tetrafluoroethylene copolymer film are substantially uniform and their passes, namely passes communicating from one surface to the other of the film are complicatedly curved, the alkali metal melt cannot pass through the film in a short time. Inherently, the microporous film of the ethylene-tetrafluoroethylene copolymer has good oxidation resistance and is resistant to the strong oxidation activity of the oxyhalide.

Further, in the conventional inorganic nonaqueous electrolytic solution type cell, the nonwoven glass fabric is used as a bottom insulator by the same reason as for the separator. But, in the present invention, the bottom insulator comprises the microporous film of the ethylene-tetrafluoroethylene copolymer.

If the nonwoven glass fabric is used as the separator as in the conventional cell, the molten alkali metal hardly passes through the bottom insulator and reaches the positive electrode since the molten metal easily passes through the separator made of the nonwoven glass fabric. However, when the separator comprises the microporous film of the ethylene-tetrafluoroethylene copolymer, the molten alkali metal tends to pass the bottom insulator made of the nonwoven glass fabric and reach the positive electrode since the flow of the molten metal through the separator to the positive electrode is suppressed. Once the molten alkali metal passes the bottom insulator and reaches the positive electrode, a vigorous reaction takes place near the bottom of cell container, the temperature rises and then the internal pressure increases suddenly. Thus, the cell container is burst at the bottom simultaneously with the breakage of the thin-walled part, and the explosion proof mechanism does not work effectively. When the bottom insulator comprises the microporous film of the ethylene-tetrafluoroethylene copolymer, such ineffective working of the explosion proof mechanism can be prevented.

In the present invention, as the separator, the microporous film of the ethylene-tetrafluoroethylene copolymer or the composite sheet of such microporous film and the nonwoven glass fabric is used.

The function of the microporous film of the ethylene-tetrafluoroethylene copolymer is described above. When the nonwoven glass fabric is used together with such microporous film, since it retains a larger amount of the electrolytic solution, a sufficient amount of the electrolytic solution can be supplied to a reaction boundary and a discharge performance under heavy load discharging can be improved.

The microporous film of the ethylene-tetrafluoroethylene has a porosity of 40 to 80% by volume, preferably 40 to 60% by volume and a thickness of 20 to 150 $\mu$m.

The nonwoven glass fabric has a porosity of 50 to 95% by volume, preferably 75 to 95% by weight and a thickness of 100 to 300 $\mu$m.

In the cell of the present invention, the bottom insulator is also made of the microporous film of the ethylene-tetrafluoroethylene copolymer or the composite sheet of such microporous film and the nonwoven glass fabric.

Since the bottom insulator insulates the positive electrode and the cell container, the microporous film and the nonwoven glass fabric may be the same as those used for the insulator, or they may have a smaller porosity and/or a large thickness.

The oxyhalide to be used in the cell of the present invention is in the liquid state at room temperature (25° C.) and its examples are thionyl chloride, sulfuryl chloride, phosphoryl chloride and mixtures thereof. The oxyhalide is the active material for positive electrode and serves as a solvent for electrolytic solution.

The electrolytic solution is prepared by dissolving an electrolyte such as $LiAlCl_4$, $LiAlBr_4$, $LiGaCl_4$, $LiB_{10}Cl_{10}$ in the oxyhalide. Alternatively, for example, LiCl and $AlCl_4$ are added to the oxyhalide to form $LiAlCl_4$ in the solution. $LiAlCl_4$ is present in the solution in the form of $Li^+$ ion and $AlCl_4^-$ ion.

Examples of the alkali metal to be used as the negative electrode are lithium, sodium and potassium.

One embodiment of the inorganic nonaqueous electrolytic solution type cell of the present invention is explained by making reference to FIGS. 1A, 1B and 2.

The cell comprises a cell container 1 made of stainless steel. The cell container 1 is in the form of a cylinder having a bottom 1a as shown in FIG. 1A, and the bottom 1a has a cross-form groove 1b to provide a thin-walled part 1c for explosion proof. A negative electrode 2 is made of an alkali metal and formed in a cylindrical form by pressing a sheet of the alkali metal to the inner wall of the cell container 1. A positive electrode 3 is made of a porous carbon molded article comprising acetylene black containing a small amount of polytetrafluoroethylene as a binder and positioned inside the negative electrode 2 with interposing a separator 4.

The separator 4 of FIG. 2 consists of a microporous film of an ethylene-tetrafluoroethylene copolymer and is in the cylindrical form and positioned between the negative electrode 2 and the positive electrode 3 to separate them.

An electrolytic solution 2 comprises a solution of an electrolyte in the oxyhalide. Since the oxyhalide serves as the solvent for the electrolytic solution, the amount of electrolytic solution is larger than in other type cells. As the oxyhalide is the active material for the positive electrode, the positive electrode 3 itself does not react, but provides a space where the oxyhalide and an alkali metal ion liberated from the negative electrode 2 react each other.

A positive collector electrode 6 is made of stainless steel, and its lower part is inserted in the positive electrode 3.

A cell cap 7 has a body 8, an insulating layer 9 made of glass or ceramics and a positive electrode terminal 10. The body 8 is made of stainless steel and an upwardly standing periphery of the body is welded to an opening edge of the cell container 2. The insulating layer 9 is positioned in the inner periphery of the body 8 and insulates the body 8 and the positive electrode terminal 10. The outer surface of the insulating layer 9 is fusion bonded to the inner surface of the body 8, and the inner surface of the insulating layer is fusion bonded to the outer surface of the positive electrode terminal 10 so as to hermetically seal the gap between the body 8 and the positive electrode terminal 10. The positive electrode terminal 10 is made of stainless steel and in a pipe form through which the electrolytic solution is poured in the cell interior during assembly of the cell. After pouring the electrolytic solution, the collector electrode 10 is inserted in the pipe form terminal 10 and the upper end part of the collector electrode is welded to the terminal to seal them.

A bottom insulator 11 of FIG. 2 consists of a microporous film of an ethylene-tetrafluoroethylene copolymer and is positioned between the positive electrode 3 and the bottom 1a of the cell container 1 to insulate the positive electrode 3 and the cell container 1 which acts as the positive electrode terminal.

A top insulator 12 is also made of a microporous film of an ethylene-tetrafluoroethylene copolymer and insulates the positive electrode 3 and the body 8 of the cell cap 7.

A periphery of each of bottom and top insulators is upwardly folded to form a shallow dish and positioned at a desired position. The folded periphery is closely contacted to the inner surface of the separator 4 to prevent formation of a gap therebetween.

In the upper internal space of the cell, an air room 13 is left to absorb volume expansion of the electrolytic solution at high temperature.

Other embodiments of the inorganic nonaqueous electrolytic solution type cell of the present invention are explained by making reference to FIGS. 3, 4 and 5.

In the cell of FIG. 3, the separator 4 consists of the microporous film of the ethylene-tetrafluoroethylene copolymer 4a and a sheet of nonwoven glass fabric 4b, and the porous film 4a faces the positive electrode 3 and the nonwoven glass fabric 4b faces the negative electrode 2.

In the cell of FIG. 4, the bottom insulator 11 consists of the microporous film of the ethylene-tetrafluoroethylene copolymer 11a and a sheet of nonwoven glass fabric 11b, and the porous film 11a faces the bottom 1a of the cell container 1 and the nonwoven glass fabric 11b faces the positive electrode 3.

In the cell of FIG. 5, the separator 4 consists of the microporous film of the ethylene-tetrafluoroethylene copolymer 4a and a sheet of nonwoven glass fabric 4b and also the bottom insulator 11 consists of the microporous film of the ethylene-tetrafluoroethylene copolymer 11a and a sheet of nonwoven glass fabric 11b. The porous film 4a faces the positive electrode 3 and the nonwoven glass fabric 4b faces the negative electrode 2. Further, the porous film 11a faces the bottom 1a of the cell container 1 and the nonwoven glass fabric 11b faces the positive electrode 3.

Other elements and structures of the cells of FIGS. 3, 4 and 5 are the same as those of the cell of FIG. 2.

Since each of the separator 4 and the bottom insulator 11 comprises the microporous film of the ethylene-tetrafluoroethylene copolymer, when the cell is abruptly heated and the alkali metal of the negative electrode is molten, the molten alkali metal slowly passes through the separator and the bottom insulator and slowly reaches the positive electrode 3. During such slow move of the molten alkali metal, the explosion proof mechanism to be actuated by the thermal expansion of the electrolytic solution normally works to prevent the burst of the cell container under high pressure.

Figure 6A:
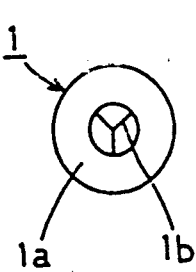
FIGS. 6A-6D are plan views of various modifications of the bottom form of the cell container.
Figure 6B:
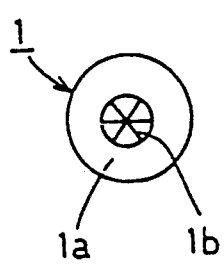
Figure 6C:
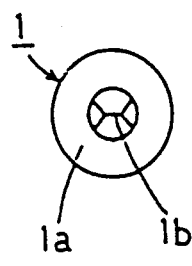
Figure 6D:
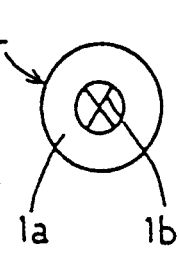

In the above embodiments, the explosion proof mechanism, namely the thin-walled part in the bottom of the cell container is provided by the cross-form groove 1b. The groove may be of other form such as a Y-letter form (FIG. 6A), an asterisk form (FIG. 6B), an H-letter from (FIG. 6C) or an X-letter form (FIG. 6D).

The present invention will be illustrated by following Examples.

EXAMPLE 1

An inorganic nonaqueous electrolytic solution type SUM 3 cell of FIG. 2 was produced by using a microporous film of an ethylene-tetrafluoroethylene copolymer having a porosity of 60% by volume and a thickness of 40 $\mu$m as a separator, a microporous film of an ethylene-tetrafluoroethylene copolymer having a porosity of 60% by volume and a thickness of 150 $\mu$m as the bottom insulator, lithium as a negative electrode, thionyl chloride as an active material for positive electrode and a solution of LiAlCl$_4$ in thionyl chloride in a concentration of 1.2 mol/liter as an electrolytic solution.

The cell container 1 was made of a stainless steel plate having a thickness of 0.3 mm and in the form of a cylinder having a bottom as shown in FIG. 1A. At the center of the bottom 1a, a cross-form groove 1b was formed as shown in FIG. 1B, whereby a thin-walled part 1c was formed for explosion proof.

A cross section of the groove 1b was a trapezoid. A width and a thickness of the thin-walled part 1c were 0.15 mm and 70 $\mu$m, respectively.

Against the inner wall of the cell container 2 having the bottom, the lithium sheet was pressed to form the negative electrode 2. Along the inner surface of the negative electrode 2, the cylindrical microporous film of the ethylene-tetrafluoroethylene copolymer 4 was placed, and the bottom insulator 11 made of the microporous film of the ethylene-tetrafluoroethylene was positioned on the bottom 1a of the cell container 1. Then, inside the microporous film 4, the cylinder form porous carbon molded article as the positive electrode 3 was inserted.

The insulating layer 9 was made of glass.

Other elements of the cell were the same as explained in connection with FIG. 2 in the above.

EXAMPLE 2

In the same manner as in Example 1 but using, as a separator 4, a composite sheet of a microporous film of an ethylene-tetrafluoroethylene copolymer having a porosity of 60% by volume and a thickness of 40 $\mu$m and a nonwoven glass fabric having a porosity of 95% by volume and a thickness of 200 $\mu$m, an inorganic nonaqueous electrolytic solution type SUM3 cell having the structure of FIG. 3 was produced.

That is, in the cell of this Example, the separator 4 consisted of the the microporous film 4a of the ethylene-tetrafluoroethylene copolymer having the above porosity and thickness and the nonwoven glass fabric 4b having the above porosity and thickness, and the microporous film faced the positive electrode 3 and the nonwoven glass fabric faced the negative electrode 2.

Except the above, the cell of this Example had the same structure as that in Example 1.

EXAMPLE 3

In the same manner as in Example 1 but using as a bottom insulator 11, a composite sheet of a microporous film of an ethylene-tetrafluoroethylene copolymer having a porosity of 60% by volume and a thickness of 150 $\mu$m and a nonwoven glass fabric having a porosity of 95% by volume and a thickness of 200 $\mu$m, an inorganic nonaqueous electrolytic solution type SUM3 cell having the structure of FIG. 4 was produced.

That is, in the cell of this Example, the bottom insulator 11 consisted of the the microporous film 11a of the ethylene-tetrafluoroethylene copolymer having the above porosity and thickness and the nonwoven glass fabric 11b having the above porosity and thickness, and the microporous film faced the bottom 1a of the cell container 1 and the nonwoven glass fabric faced the positive electrode 3.

Except the above, the cell of this Example had the same structure as that in Example 1.

EXAMPLE 4

In the same manner as in Example 1 but using, as a separator 4, a composite of a microporous film of an ethylene-tetrafluoroethylene copolymer having a porosity of 60% by volume and a thickness of 40 μm and a nonwoven glass fabric having a porosity of 95% by volume and a thickness of 200 μm and, as as a bottom insulator 11, a composite sheet of a microporous film of an ethylene-tetrafluoroethylene copolymer having a porosity of 60% by volume and a thickness of 150 μm and a nonwoven glass fabric having a porosity of 95% by volume and a thickness of 200 μm, an inorganic nonaqueous electrolytic solution type SUM3 cell having the structure of FIG. 5 was produced.

That is, in the cell of this Example, the separator 4 consisted of the the microporous film 4a of the ethylene-tetrafluoroethylene copolymer having the above porosity and thickness and the nonwoven glass fabric 4b having the above porosity and thickness, and the microporous film faced the positive electrode 3 and the nonwoven glass fabric faced the negative electrode 2. Further, the bottom insulator 11 consisted of the the microporous film 11a of the ethylene-tetrafluoroethylene copolymer having the above porosity and thickness and the nonwoven glass fabric 11b having the above porosity and thickness, and the microporous film faced the bottom 1a of the cell container 1 and the nonwoven glass fabric faced the positive electrode 3.

Except the above, the cell of this Example had the same structure as that in Example 1.

COMPARATIVE EXAMPLE

In the same manner as in Example 1 but using, as a separator, a nonwoven glass fabric having a porosity of 95% by volume and a thickness of 200 μm and, as a bottom insulator, a nonwoven glass fabric having a porosity of 95% by volume and a thickness of 200 μm, an inorganic nonaqueous electrolytic solution type SUM3 cell was produced.

Ten cells produced in each of Examples 1–4 and Comparative were suspended in a fire flame generated by burning wood, and the number of the cells the explosion proof mechanism did not work and the cell container of which was burst with a large burst noise. The results are shown in Table.

TABLE

| Example No. | Number of cells the container of which was burst |
| --- | --- |
| 1 | 0 |
| 2 | 0 |
| 3 | 0 |
| 4 | 0 |
| Comparative | 6 |

As seen from the results of Table, with the cells produced in Examples 1–4, the explosion proof mechanism normally worked and the cell container was not burst.

In contrast, among ten cells produced in Comparative Example, the cell containers of six cells were burst. This is because, with the six cells of Comparative Example, before the explosion proof mechanism worked, the molten lithium passed through the separator 4 and reached the positive electrode 3, and on the positive electrode, the molten lithium vigorously reacted with the material composing the positive electrode, whereby the internal temperature of the cell abruptly rose and in turn the internal pressure abruptly increased. Finally the cell container was burst.

In the cells produced in Examples 1–4, since separator 4 and/or the bottom insulator 11 comprised the microporous film of the ethylene-tetrafluoroethylene copolymer, the molten lithium slowly passed through the separator and/or the bottom insulator and slowly reached the positive electrode 3. Therefore, the explosion proof mechanism normally worked before the vigorous reaction of the lithium on the positive electrode took place.

What is claimed is:

1. An inorganic nonaqueous electrolytic solution type cell comprising:

a cell container in the form of a cylinder which has a bottom with a thin-walled explosion proof part, a cell cap which comprises a body, a positive electrode terminal and an insulating layer for insulating said body and said positive electrode terminal, a periphery of said body being bonded to an opening edge of said cell container, a negative electrode which is made of an alkali metal and positioned inside said cell container, a positive electrode which is made of a porous carbonaceous material and positioned inside said negative electrode, a separator which is positioned between said negative electrode and said positive electrode, a bottom insulator which is positioned between said bottom of the cell container and said positive electrode, and an electrolytic solution comprising an electrolyte and an oxyhalide which is in the liquid state at room temperature and serves as an active material for said positive electrode and a solvent for said electrolytic solution, wherein each of said separator and said bottom insulator comprises a material selected from the group consisting of a microporous film of an ethylene-tetrafluoroethylene copolymer and a composite sheet of a microporous film of an ethylene-tetrafluoroethylene copolymer and a nonwoven glass fabric.

2. The inorganic nonaqueous electrolytic solution type cell according to claim 1, wherein said microporous film of the ethylene-tetrafluoroethylene has a porosity of 40 to 80% by volume.

3. The inorganic nonaqueous electrolytic solution type cell according to claim 2, wherein said microporous film of the ethylene-tetrafluoroethylene has a porosity of 40 to 60% by volume.

4. The inorganic nonaqueous electrolytic solution type cell according to claim 1, wherein said nonwoven glass fabric has a porosity of 50 to 95% by volume.

5. The inorganic nonaqueous electrolytic solution type cell according to claim 4, wherein said nonwoven glass fabric has a porosity of 75 to 95% by volume.

6. The inorganic nonaqueous electrolytic solution type cell according to claim 1, wherein said oxyhalide is at least one selected from the group consisting of thionyl chloride, sulfuryl chloride and phosphoryl chloride.

7. The inorganic nonaqueous electrolytic solution type cell according to claim 1, wherein said alkali metal is one selected from the group consisting of lithium, sodium and potassium.

8. The inorganic nonaqueous electrolytic solution type cell according to claim 1, wherein an electrolyte in said electrolytic solution is one selected from the group consisting of $LiAlCl_4$, $LiAlBr_4$, $LiGaCl_4$ and $LiB_{10}Cl_{10}$.

* * * * *